R. E. BALCH.
ANIMAL SHOEING APPARATUS.
APPLICATION FILED AUG. 18, 1911.

1,022,399.

Patented Apr. 9, 1912.

2 SHEETS—SHEET 1.

WITNESSES

Reuben E. Balch INVENTOR

Halbert B. Case Attorney

R. E. BALCH.
ANIMAL SHOEING APPARATUS.
APPLICATION FILED AUG. 18, 1911.

1,022,399.

Patented Apr. 9, 1912.
2 SHEETS—SHEET 2.

WITNESSES

Reuben E. Balch INVENTOR
By Halbert B. Case Attorney

UNITED STATES PATENT OFFICE.

REUBEN E. BALCH, OF LONG ISLAND, ALABAMA, ASSIGNOR OF ONE-HALF TO JOSEPH T. THOMASSON, OF CHATTANOOGA, TENNESSEE.

ANIMAL-SHOEING APPARATUS.

1,022,399. Specification of Letters Patent. Patented Apr. 9, 1912.

Application filed August 18, 1911. Serial No. 644,818.

*To all whom it may concern:*

Be it known that I, REUBEN E. BALCH, a citizen of the United States, residing at Long Island, in the county of Jackson and State of Alabama, have invented certain new and useful Improvements in Animal-Shoeing Apparatus, of which the following is a specification, reference being had therein to the accompanying drawings.

My invention relates to improvements in animal-shoeing devices and the object of my invention is to provide an article of manufacture which is simple in construction and inexpensive.

A further object of my invention is to provide an article capable of quick and easy adjustment and one which will hold an animal's foot steadily in place and prevent kicking or leaning upon the body of the shoer, and prevent injury to the shoer.

With these objects in view I illustrate my invention in the accompanying drawings, describe it in the specification and set forth my claim in relation thereto.

Figure 1:
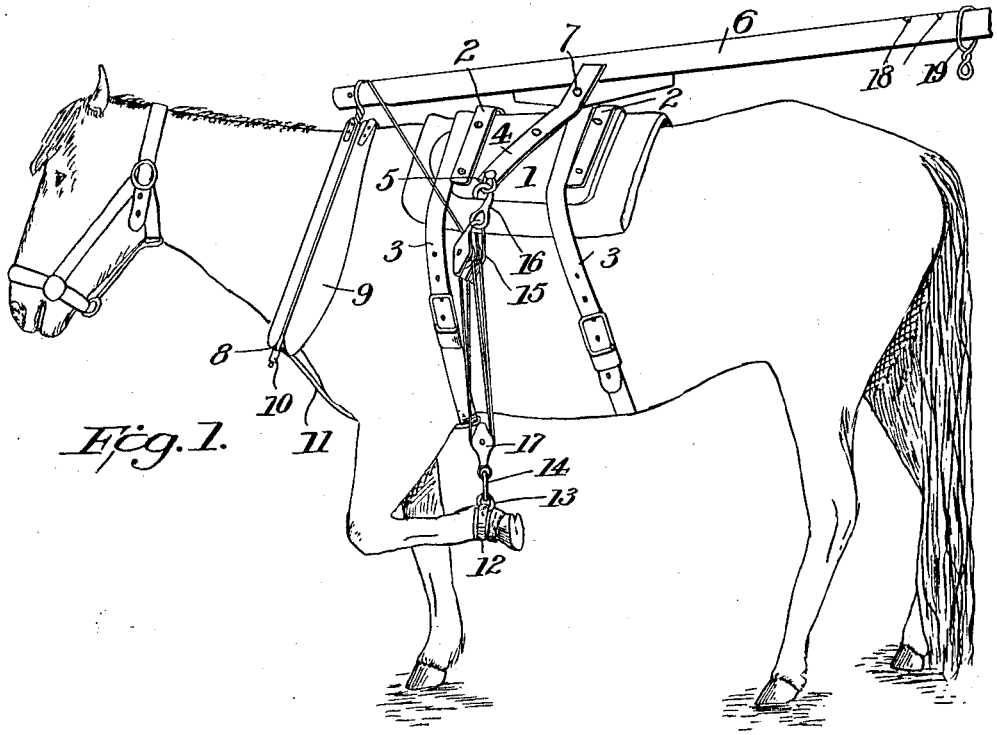
Figure 4:
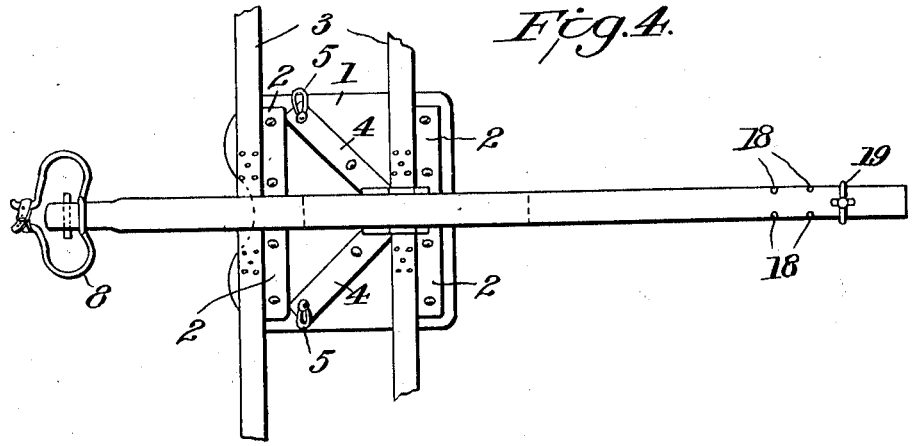
Figure 2:
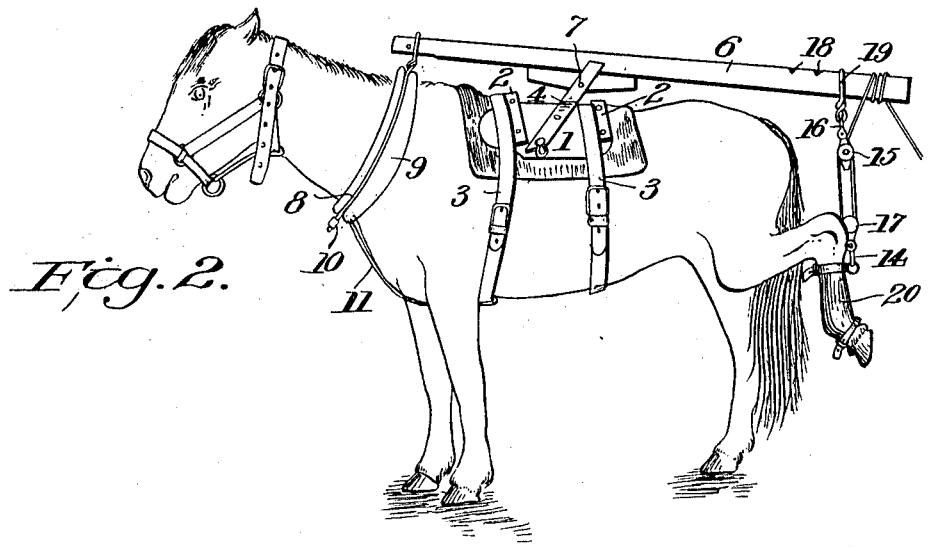
Figure 3:
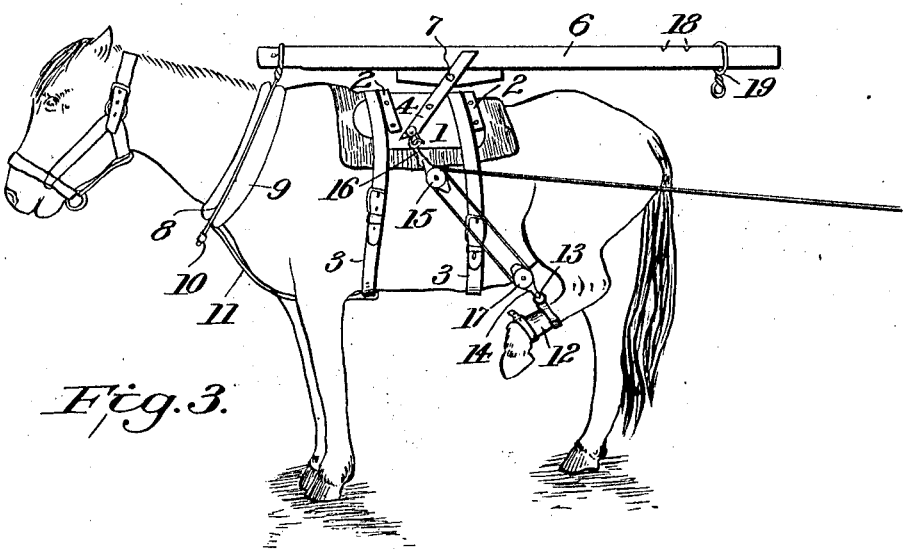

In the drawings Figure 1 is a perspective view showing the left fore foot of a horse supported by my device; Fig. 2 is a perspective view showing my apparatus supporting the left hind foot of a horse; Fig. 3 is a perspective view of my device showing the left hind foot of a horse supported in a position different from that shown in Fig. 2; Fig. 4 is a detail plan view of the saddle and lever.

Referring to the drawings, 1 represents the saddle, made of any suitable material, the two parts of which are held together by the metal bars 2—2. The girth straps 3—3 are also attached to the saddle. The metal bar 4 is permanently fixed to the saddle, the lower stud of said bar supporting a metal loop 5 and the upper portion of said bar being pivoted to the lever 6 at the point 7. This lever 6 passes through a loop at the upper end of metal hames 8 which hames fit into the grooves in the collar 9 and are fastened together at the point 10 by any suitable means. The strap 11 is attached to the collar at one end and buckles into the front girth strap 3 at the other end for the purpose of keeping the collar from slipping forward and choking the animal. The foot support 12 has a ring 13 upon it, for the purpose of detachably receiving the hook 14 attached to the pulley 17 thereto. This pulley 17, in connection with the pulley 15 and its hook 16, and through the medium of a cable, made of any suitable material, acts directly to raise and support the animal's foot from the ground. The lever or bar 6 has a series of notches cut therein for the purpose of being engaged by the larger loop in the metal hanger 19, the smaller loop of said hanger being for the adjustment of the pulley 15 when desired. The boot 20 is made by a combination of a metal bar with an eye bolt attached thereto to which leather of the proper shape is attached for the purpose of increasing the protection to the animal's foot. This boot is fastened in the usual manner by buckles.

The operation of the device is as follows: When it is desirable to raise the foot of an animal for any purpose, the saddle is placed upon its back and made fast with the girth straps, the collar fastened on and one end of the leather strap at its lower part fastened to the front girth strap. The loop of the hames is slid over the lever and the hames placed in the groove in the collar and fastened. The next step is to buckle a support, having a ring made integral therewith, to the animal's foot and then to hook a pulley to the ring attached to the saddle for its reception and another pulley to the ring of the support. A cable is, of course, passed through the pulleys in the proper manner and it is manipulated until the animal's foot is raised the proper distance from the ground when it is made fast to the lever either near the collar, or at its opposite end or it may be manually held. One of the back feet of an animal may be raised and held from the ground by attaching one of the pulleys to the metal loop which engages the end of the lever to the rear of the animal, the operation in all other particulars being the same as heretofore explained.

What I claim is:

In an animal shoeing device, a saddle, a lever having notches near one end, a loose ring adapted to rest in one of said notches, a bar attached to said saddle to which said lever is pivoted, a collar, hames, having a loop adapted to be engaged by one end of said lever, adapted to be fastened in the grooves of said collar, means for holding the collar from slipping forward, a foot support, and means adapted to be secured to said support at one end and to the said ring which is adapted to rest in one of said notches in the lever at the other end, whereby one of the animal's feet may be raised and held from the ground, substantially as described.

In testimony whereof I affix my signature in the presence of two witnesses.

REUBEN E. BALCH.

Witnesses:
 ALEX STEWART,
 J. L. GENTRY.

Copies of this patent may be obtained for five cents each, by addressing the "Commissioner of Patents, Washington, D. C."